Sept. 15, 1970  O. P. KUBACH  3,528,472

SAFETY DEVICE FOR AUTOMOBILE WHEELS

Filed Jan. 10, 1968  2 Sheets-Sheet 1

INVENTOR
OSCAR P. KUBACH
BY
Isler & Arnstein
ATTORNEYS

Sept. 15, 1970   O. P. KUBACH   3,528,472
SAFETY DEVICE FOR AUTOMOBILE WHEELS
Filed Jan. 10, 1968   2 Sheets-Sheet 2

INVENTOR
OSCAR P. KUBACH
BY
*Isler & Ornstein*
ATTORNEYS

United States Patent Office 3,528,472
Patented Sept. 15, 1970

3,528,472
SAFETY DEVICE FOR AUTOMOBILE WHEELS
Oscar P. Kubach, 1029 Homewood Drive,
Lakewood, Ohio 44107
Filed Jan. 10, 1968, Ser. No. 696,785
Int. Cl. B60c 17/04, 27/10
U.S. Cl. 152—158                                    4 Claims

ABSTRACT OF THE DISCLOSURE

A safety device is provided, in the form of interconnected segments disposed within an automobile tire, and forming, in effect, an auxiliary or emergency wheel, permitting use of the tire upon sudden deflation of the tire, without damage to the tire or injury to the car or its occupants until the tire can be repaired or replaced.

---

The invention has as its primary object, the provision of a safety device which may be placed within an automobile tire, and which becomes effective or operative automatically upon sudden deflation of the tire, as the result of a blowout or the like, to minimize or eliminate the danger resulting from such blowout.

Another object of the invention is to provide a safety device of the character described, which is especially adapted for use with automobile tires of the tubeless variety.

A further object of the invention is to provide a safety device of the character described, which can be quickly and easily installed in an automobile tire, without the use of special tools, and which is so designed that the weight thereof is uniformly distribuetd within the tire, so that it does not appreciably affect the "balance" of the tire or wheel.

A still further object of the invention is to provide a safety device of the character described, which is relatively inexpensive to manufacture and assemble, and can be sold in commercially feasible quantities at a relatively low price.

Other objects and advantages of my invention will be apparent during the course of the following description.

In the accompanying drawings forming a part of this specification, and in which like numerals are employed to designate like parts throughout the same, FIG. 1 is a view showing a safety device embodying the invention as assembled on an automobile wheel rim;

Figure 1:
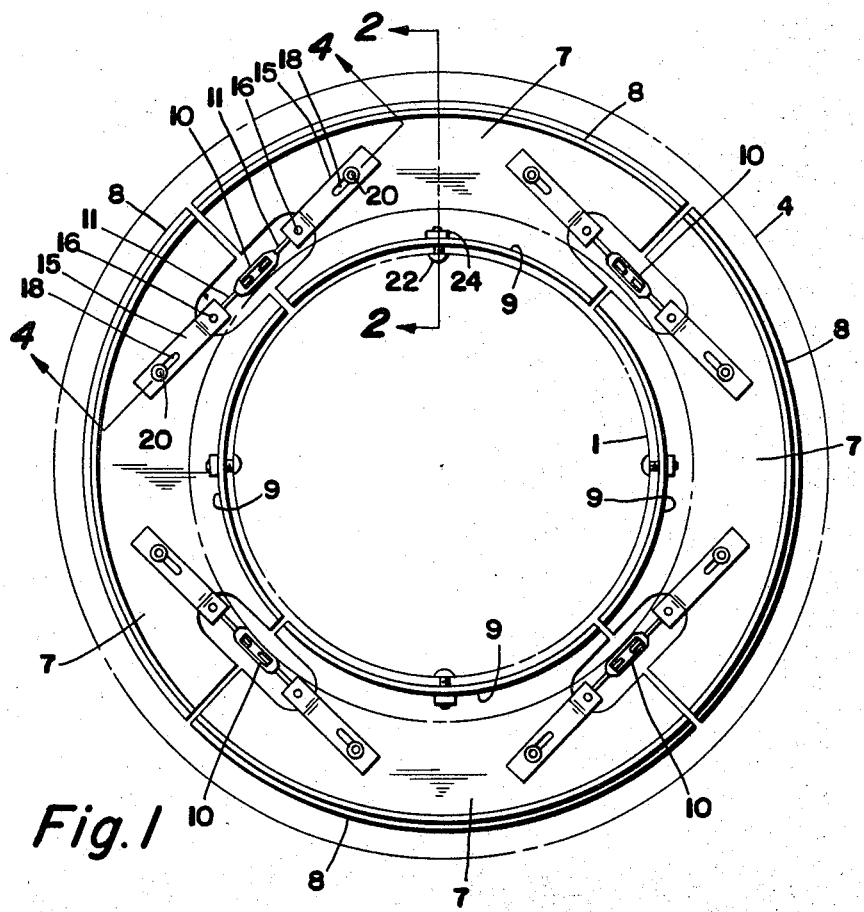

Referring more particularly to FIGS. 1 to 4 inclusive, there is shown in broken outline an automobile wheel rim 1 having side flanges 2 and 3.

Mounted on the rim 1 is an automobile tire 4, of the conventional tubeless type, the beads 5 and 6 of which engage the flanges 2 and 3 respectively of the rim, when the tire is inflated.

The safety device of the present invention is disposed within the tire 4, and comprises, in this instance, four identical arcuate metallic segments, each consisting of a vertical web 7, an outer flange 8 which is curved transversely to conform generally to the curvature of the inner surface of the tread of the tire, and an inner or base flange 9 which bears against the wheel rim 1.

When the safety device is in operative position, the base flanges 9 of the segments, lie, as stated, against the wheel rim 1 with the ends of the segments disposed substantially in end to end relation to each other, to form, in effect, an auxiliary or emergency wheel or tire, of which the flanges 8 provide the outer tread, this outer tread being spaced approximately one inch from the inner wall of the tread of the tire 4, when the tire is in fully inflated condition.

Figure 4:
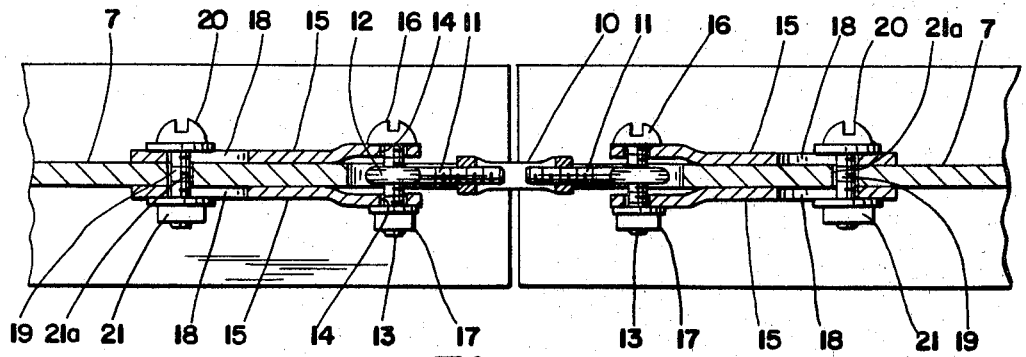
FIG. 4 is a fragmentary cross-sectional view, taken on the line 4—4 of FIG. 1.

The segments, as thus described, are rigidly maintained in such operative position by means of connectors which are best seen in FIGS. 1 and 4.

Each connector comprises a turnbuckle 10 having bolts 11 threadedly connected thereto and provided at their outer ends with eyes 12 through which bolts 13 extend.

The bolts 13 extend through openings 14 in one end of a pair of links 15 which straddle the webs 7 of adjacent segments of the safety device. The bolts 13 are provided with heads 16 and are retained against displacement by nuts 17.

The links 15 are provided in their other end with elongated slots 18, through which a bolt 19 extends, the bolts 19 being provided with heads 20 and being maintained against displacement by nuts 21. The bolts 19 also extend through holes 21a in the webs 7.

It will be understood that when the turnbuckles 10 are turned in one direction, the effect is to draw the segments toward each other until the base flanges 9 thereof tightly engage the wheel rim 1.

However, in order to facilitate insertion of the safety device within the tire, and to enable the segments to easily clear the flanges 2 and 3 of the rim during such insertion, it is necessary that the segments be movable radially outwardly with respect to the rim during such insertion. This radially-outward movement is permitted by turning the turnbuckles 10 in a direction opposite to that in which they are turned for tightening purposes, so that the slots 18 at the left in FIG. 4 are moved to the left, and the slots 18 at right in FIG. 4 are moved to the right. This provides a lost-motion connection between the links 15 and the bolts 19, as a consequence of which the segments may be moved in a radially-outward direction to facilitate insertion of the safety device within the tire. After the device has been thus inserted, the segments are drawn tightly against the rim 1 by means of the turnbuckles.

Figure 2:
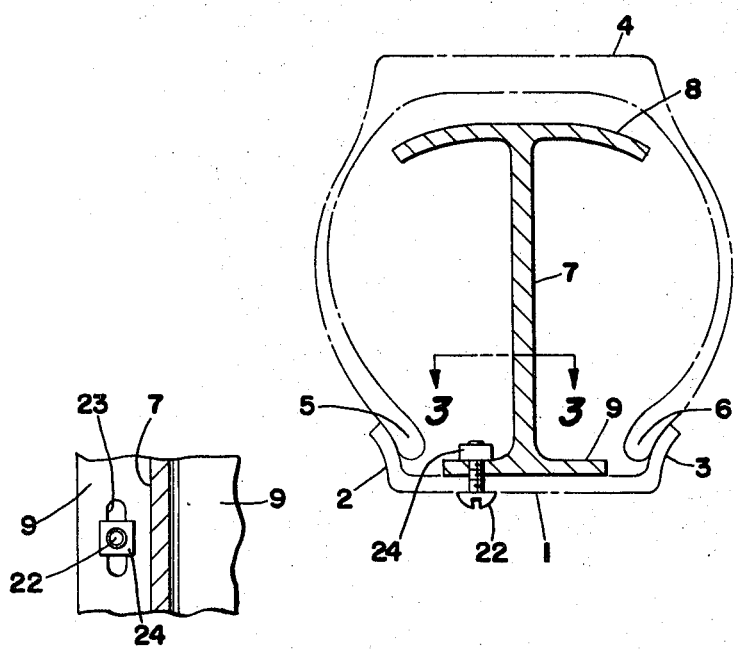
FIG. 2 is a fragmentary cross-sectional view, taken on the line 2—2 of FIG. 1.
Figure 3:
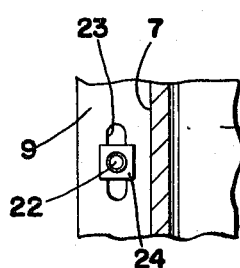
FIG. 3 is a fragmentary cross-sectional view, taken on the line 3—3 of FIG. 2.

In order to properly center the segments transversely with respect to the rim, and to insure against displacement of the segments both circumferentially and transversely with respect to the rim, I provide, as most clearly shown in FIGS. 1, 2 and 3, bolts 22 which extend through the rim and through elongated slots 23 in the base flanges 9 of the segments, and are retained in position by nuts 24. Since these bolts are of substantially the same diameter as the width of the slots 23, the effect is to prevent transverse displacement of the segments with respect to the rim. By making the slots 23 of slightly elongated form, the placement of the slots with respect to the bolts is facilitated.

It will be apparent from the foregoing description that if the tire 4 should become suddenly deflated, as the result of a blowout, or for any other reason, the tread portion of the tire will come into engagement with the flanges 8 of the segments of the safety device, so that these flanges form, in effect, an auxiliary or emergency wheel for maintaining the tire in a drivable condition, for a time, at least, to enable the automobile to be driven to a gas station or service garage for repair or replacement of the tire, and without appreciable damage to the deflated tire.

It is thus seen that I have provided a safety device which may be placed within an automobile tire and which becomes effective or operative automatically and immediately upon sudden deflation of the tire, to minimize or eliminate the danger resulting from such deflation; which is especially adapted for use with automobile tires of the tubeless variety; which can be quickly and easily installed in such tires, without the use of special tools; which is so designed that the weight thereof is uniformly distributed within the tire, so that it does not appreciably affect the "balance" of the tire or wheel; and which is relatively inexpensive to manufacture and assemble, so that it can be sold in commercial feasible quantities at a relatively low price.

Moreover, since the safety device is disposed entirely within the tire, and is covered by the rim, it is completely protected, at all times, against rusting or deterioration by rain, snow, mud or other factors which would thus affect a safety device mounted externally of the tire and rim.

Figure 5:
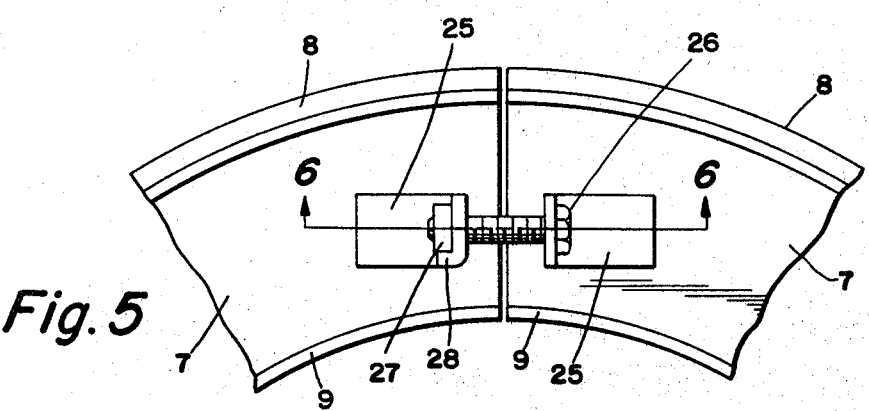
FIG. 5 is a fragmentary elevational view, similar to a portion of FIG. 1, but showing a modification of the segment connections.
Figures 6, 7:
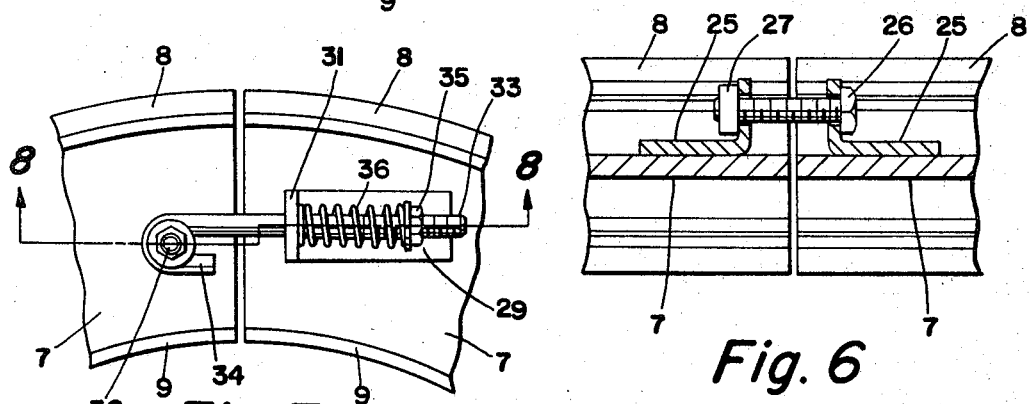
FIG. 6 is a fragmentary cross-sectional view, taken on the line 6—6 of FIG. 5.
FIG. 7 is a view similar to FIG. 5, but showing another modification of the segment connections.

In FIGS. 5 and 6, a modification is shown, in which angle members 25 are secured to the webs 7 of the segments, and a bolt 26 and nut 27 are employed to adjustably interconnect the angle members. One of the angle members 25 is provided with a flange 28 which bears against the nut 27 to prevent turning of the nut when the bolt 26 is tightened or loosened.

Figure 8:
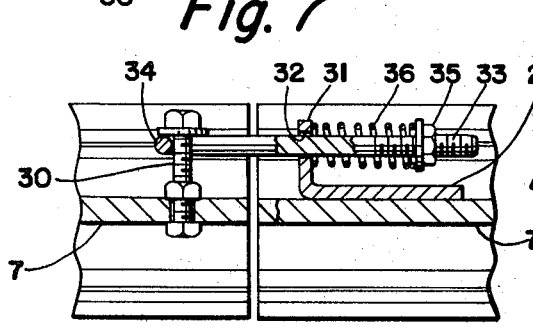
FIG. 8 is a fragmentary cross-sectional view, taken on the line 8—8 of FIG. 7.

In FIGS. 7 and 8, another modification is shown, in which a plate 29 is secured to the web 7 of one segment, and a bolt 30 is secured to the web 7 of an adjacent segment.

The plate 29 is provided with a flange 31 having a hole 32 through which a threaded rod 33 extends, this rod having a hook-like end 34 which engages the bolt 30. A nut 35 is mounted on the rod 33, and a compression coil spring 36 is interposed between the nut 35 and the flange 31. The spring 36 exerts pressure on the nut 35 to cause the end 34 of the rod 33 to pull the bolt 30 to the left, thus causing the segments of the safety device to contract about the rim of the wheel to maintain the segments in operative position.

In order to enable the segments to be moved relatively to each other to facilitate their insertion in the tire, a tool may be used to compress the spring 36, to thereby temporarily disengage the end 34 of the rod 33 from the bolt 30.

It is to be understood that the forms of my invention, herewith shown and described, are to be taken as preferred examples of the same, and that various changes may be made in the shape, size and arrangement of parts thereof, without departing from the spirit of the invention.

Having thus described my invention, I claim:

1. In combination with an automobile wheel rim and tire, a safety device mounted within said tire, and comprising a plurality of arcuate segments in end-to-end arrangement disposed against said rim, each of said segments comprising a web portion and spaced inner and outer flanges, said outer flanges forming an abutment for the tread portion of the tire upon sudden deflation of the tire, and means interconnecting the webs of said segments and adapted to draw the segments tightly against said rim, said means having at least one component which is adjustable in a plane substantially parallel with the plane of said web to vary the extent to which the segments are drawn together.

2. A safety device for tubeless automobile tires and the like, said device comprising a plurality of arcuate segments in end-to-end arrangement, each of said segments comprising a web portion and spaced inner and outer flanges, said outer flanges adapted to provide an abutment for the tread portion of the tire upon sudden deflation of the tire, and means interconnecting the webs of said segments and adapted to draw the segments together in said end-to-end arrangement, said means having at least one component which is adjustable in a plane substantially parallel with the plane of said web to vary the extent to which the segments are drawn together.

3. In combination with an automobile wheel rim and tire, a safety device mounted within said tire, and comprising a plurality of arcuate segments in end-to-end arrangement disposed against said rim, each of said segments comprising a web portion and inner and outer flanges, said outer flanges forming an abutment for the tread portion of the tire upon sudden deflation of the tire, and means interconnecting the segments and adapted to draw the segments tightly against said rim, said means comprising links pivotally connected to the web portions of said segments, bolts connected to said links, eyebolts pivotally connected to said first-named bolts, and turnbuckles interconnecting said eyebolts.

4. A safety device for tubeless automobile tires and the like, said device comprising a plurality of arcuate segments in end-to-end arrangement, each of said segments comprising inner and outer spaced flanges and a web interconnecting said flanges, said outer flanges adapted to provide an abutment for the tread portion of a tire upon sudden deflation of the tire, and means interconnecting the segments and adapted to draw the segments together in said end-to-end arrangement, said means comprising links pivotally connected to the webs of adjacent segments, bolts connected to said links, eyebolts connected to said first-named bolts, and turnbuckles interconnecting said eyebolts.

References Cited

UNITED STATES PATENTS

| | | | |
|---|---|---|---|
| 2,040,645 | 5/1936 | Dickinson | 152—158 |
| 2,262,780 | 11/1941 | Sherwood | 152—158 |
| 2,936,016 | 5/1960 | Stack | 152—217 |
| 2,989,108 | 6/1961 | Gore | 152—158 |
| 3,394,749 | 7/1968 | Lindley | 152—158 |

ARTHUR L. LA POINT, Primary Examiner

C. B. LYON, Assistant Examiner

U.S. Cl. X.R.

152—217